United States Patent
Chen et al.

(10) Patent No.: US 11,476,680 B2
(45) Date of Patent: Oct. 18, 2022

(54) DEVICE AND METHOD FOR CHARGING CONTROL, ELECTRONIC DEVICE

(71) Applicant: GUANGDONG OPPO MOBILE TELECOMMUNICATIONS CORP., LTD., Dongguan (CN)

(72) Inventors: Shebiao Chen, Dongguan (CN); Jialiang Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/351,224

(22) Filed: Jun. 17, 2021

(65) Prior Publication Data

US 2021/0313812 A1    Oct. 7, 2021

Related U.S. Application Data

(63) Continuation of application No. PCT/CN2018/122575, filed on Dec. 21, 2018.

(51) Int. Cl.
*H02J 7/04* (2006.01)
*H02J 7/34* (2006.01)
*H02J 7/00* (2006.01)

(52) U.S. Cl.
CPC .......... *H02J 7/0014* (2013.01); *H02J 7/0063* (2013.01); *H02J 7/0068* (2013.01); *H02J 7/00712* (2020.01); *H02J 7/345* (2013.01)

(58) Field of Classification Search
CPC .. H02J 2207/20; H02J 2207/50; H02J 7/0003; H02J 7/00034; H02J 7/00045;

(Continued)

(56) References Cited

U.S. PATENT DOCUMENTS 10,644,524 B2 * 5/2020 Shiba .................... H02J 7/00
2003/0169022 A1 * 9/2003 Turner .................. H02J 7/0013
320/166

(Continued)

FOREIGN PATENT DOCUMENTS

CN    201574868 U    9/2010
CN    204732902 U    10/2015

(Continued)

OTHER PUBLICATIONS

Supplementary Search Report dated Jan. 12, 2022 From the Extended European search report(EESR) issued in corresponding European Application No. 18944035.7, 7 pages.

(Continued)

*Primary Examiner* — Levi Gannon
(74) *Attorney, Agent, or Firm* — Bayes PLLC

(57) ABSTRACT

A device and a method for charging control, and an electronic device are provided. The device includes an interface module configured to be connected to an external charging device; a battery unit including a plurality of battery cells connected in series; a controller connected to the interface module, and configured to identify a charging mode of the external charging device and send a control instruction correspondingly according to the charging mode; a charging circuit connected to the controller and the battery unit and configured to receive the control instruction, so as to charge the battery unit according to a charging signal output by the external charging device; and a voltage dividing circuit connected in series with the battery unit, and configured to divide an output voltage of the battery unit to obtain a power supply voltage suitable for powering the electronic device.

14 Claims, 4 Drawing Sheets

(58) Field of Classification Search
CPC ...... H02J 7/0013; H02J 7/0014; H02J 7/0063; H02J 7/0068; H02J 7/007; H02J 7/00711; H02J 7/00712; H02J 7/00714; H02J 7/007182; H02J 7/007184; H02J 7/0077; H02J 7/02; H02J 7/022; H02J 7/04; H02J 7/045; H02J 7/34; H02J 7/342; H02J 7/345
See application file for complete search history.

(56) References Cited

U.S. PATENT DOCUMENTS

| | | | | |
|---|---|---|---|---|
| 2006/0071643 | A1* | 4/2006 | Carrier | H02J 7/0014 320/132 |
| 2008/0054846 | A1 | 3/2008 | Hsu et al. | |
| 2009/0033293 | A1 | 2/2009 | Xing et al. | |
| 2011/0050172 | A1* | 3/2011 | Sano | H02J 7/00306 320/118 |
| 2014/0009120 | A1* | 1/2014 | Kim | H02J 7/0068 320/138 |
| 2016/0064959 | A1* | 3/2016 | Jung | G06F 1/26 320/162 |
| 2017/0040817 | A1* | 2/2017 | Hu | H02J 7/00047 |
| 2017/0294790 | A1* | 10/2017 | Tian | H02J 7/04 |
| 2018/0145530 | A1* | 5/2018 | Lee | H02J 7/0029 |
| 2018/0205253 | A1* | 7/2018 | Kwak | H02J 7/0036 |
| 2018/0269697 | A1* | 9/2018 | Zhang | H02J 7/0016 |
| 2019/0006855 | A1* | 1/2019 | MacDonald | H02J 7/04 |
| 2019/0109483 | A1* | 4/2019 | Huo | H02J 7/0071 |

FOREIGN PATENT DOCUMENTS

| | | |
|---|---|---|
| CN | 105375557 A | 3/2016 |
| CN | 107546808 A | 1/2018 |
| CN | 107947252 A | 4/2018 |
| KR | 20180101930 A | 9/2018 |

OTHER PUBLICATIONS

International Search Report and the Written Opinion dated Sep. 27, 2019 From the International Searching Authority Re. Application No. PCT/CN2018/122575.

Lan Shao Shuo Wangze, What is a super capacitor? What are the benefits of battery/battery smart super smart?, Website, Jun. 18, 2009, https://baijiahao.baidu.com/s?id=16027635768286l2949&wfr=spider&for=pc, Baidu, China.

* cited by examiner

DEVICE AND METHOD FOR CHARGING CONTROL, ELECTRONIC DEVICE

CROSS REFERENCE TO RELATED APPLICATION

This application is a continuation of International Application No. PCT/CN2018/122575, filed on Dec. 21, 2018, the entire contents of which are incorporated herein by reference.

BACKGROUND

The present disclosure relates to the field of charging technology, more particularly, to a device and method for charging control and an electronic device.

At present, electronic devices enjoy increasing popularity among consumers. However, electronic devices consume a large amount of power and need to be charged to meet the users' demand for electronic devices.

Typical electronic devices mainly adopt a single battery cell for supplying power, which has a limited capacity and in turn limit the usage scenarios.

SUMMARY

The present disclosure provides a device and method for charging control and an electronic device that are able to use multiple battery cells to power the electronic device, so as to improve the efficiency of powering the electronic device.

A device for charging control configured to power an electronic device, the device includes an interface module configured to be connected to an external charging device; a battery unit including a plurality of battery cells connected in series; a controller connected to the interface module, and configured to identify a charging mode of the external charging device and send a control instruction correspondingly according to the charging mode; a charging circuit connected to the controller and the battery unit and configured to receive the control instruction, so as to charge the battery unit according to a charging signal output by the external charging device; and a voltage dividing circuit connected in series with the battery unit, and configured to divide an output voltage of the battery unit to obtain a power supply voltage suitable for powering the electronic device.

An electronic device including a system to be powered further includes the device for charging control. The device for charging control is configured to supply power to the system to be powered.

A method for charging control applied to a device for charging control. The device for charging control includes an interface module configured to be connected to an external charging device, a battery unit including a plurality of battery cells connected in series, a charging circuit and a voltage dividing circuit. The charging circuit is connected to the interface module and the battery unit, and is configured to charge the battery unit according to a charging signal output by the external charging device. The voltage dividing circuit is connected in series with the battery unit, and is configured to divide an output voltage of the battery unit to obtain a power supply voltage suitable for powering the electronic device. The method includes identifying a charging mode of the external charging device, and sending a control instruction correspondingly according to the charging mode; and controlling the charging circuit to charge the battery unit according to the control instruction and the charging signal output by the external charging device.

The above device and method for charging control and the electronic device can identify the charging mode of the external charging device connected to the interface module to further control the charging circuit to charge the battery unit according to the charging signal provided by the external charging device, and then utilize the voltage dividing circuit to convert the discharge voltage of the battery unit into the power supply voltage capable of powering the electronic device. Power can be supplied to the system to be powered in the electronic device. Multi-cell power supply for the electronic device can be realized, and the efficiency of powering the electronic device is improved.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show merely some embodiments of this disclosure, and a person of ordinary skill in the art may still derive other drawings from these accompanying drawings without creative efforts.

DETAILED DESCRIPTION

Figure 1:
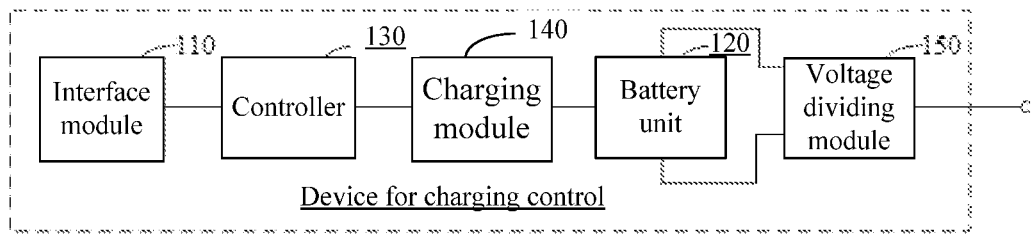
FIG. 1 is a structural schematic diagram of a device for charging control according to one embodiment of the present disclosure.

In order to facilitate the understanding of the present disclosure, the present disclosure will be described more fully below with reference to the relevant drawings. The preferred embodiments of the present disclosure are shown in the drawings. However, the present disclosure can be implemented in many different forms and is not limited to the embodiments described herein. On the contrary, the purpose of providing these embodiments is to make the understanding of the disclosure of the present disclosure more thorough and comprehensive.

In order to make the objectives, technical solutions, and advantages of the present disclosure clearer, the following further describes the present disclosure in detail with reference to the accompanying drawings and embodiments. It should be understood that the specific embodiments described here are only used to explain the present disclosure, and are not used to limit the present disclosure.

It will be understood that, although the terms "first," "second," etc., may be used herein to describe various elements, these elements should not be limited by these terms. These terms are used to distinguish one element from another. For example, a first charging unit could be termed a second charging unit, and, similarly, a second charging unit could be termed a first charging unit, without departing from the scope of the present disclosure. Both the first charging unit and the second charging unit are charging units, but they are not the same charging unit.

The present disclosure provides a device for charging control configured to power an electronic device. The electronic device may be an electronic device with the built-in device for charging control, for example, any terminal device including a mobile terminal, a tablet computer, a personal digital assistant (PDA), a point of sales (POS), an in-vehicle computer, a wearable device, a mobile power supply, or the like, that can be charged by using an external charging device and store electrical energy, so as to supply power to a system to be powered of the electronic device.

As shown in FIG. 1, a device for charging control includes an interface module 110, a battery unit 120, a controller 130, a charging circuit 140 and a voltage dividing circuit 150.

The interface module 110 is configured to be connected to an external charging device. The interface module 110 includes charging interfaces, such as VBUS, USB+, USB-, GND, etc. The external charging device may include a fast charging charger or a fast charging adaptor that can provide fast charging for an electronic device or a normal adaptor. For example, the fast charging charger or the fast charging adaptor can provide charging power greater than 15 W. The normal adaptor may be a 5V 1A or a 5V 2A adaptor.

The interface type in the interface module 110 of the present disclosure is not limited. For example, it may be a Micro usb interface, a Type-C interface, a 30-*pin* interface, a lightning interface, and so on.

The battery unit 120 includes a plurality of battery cells connected in series. In one embodiment, a number of the battery cells included in the battery unit 120 may be 2, 3, 4 or more, and the plurality of battery cells are connected in series. A type of the battery cells of the battery unit 120 may include at least one of a lead-acid battery, a nickel-hydrogen battery, a sodium-sulfur battery, a flow battery, a super capacitor, a lithium battery and a flexible battery. For example, the battery unit 120 may include three lithium batteries connected in series, or the battery unit 120 may include four lithium batteries connected in series.

In some embodiments, a range of an output voltage of each of the battery cells may be from 2.0 volt to 4.4 volt. It should be understood that a balancing process can be performed on the output voltage of each of the battery cells in the battery unit 120 to balance voltage signals among the plurality of battery cells. It is noted that in the present disclosure, "the plurality of" can be understood as "at least two" (greater than or equal to 2), that is, "the plurality of" is 2, 3 or even more.

The controller 130 is connected to the interface module 110 and is configured to identify a charging mode of the external charging device, and send a control instruction correspondingly according to the charging mode. When the interface module 110 is connected to the external charging device, the controller 130 can identify the charging mode of the external charging device. The controller 130 can further send the corresponding control instruction according to the identified charging mode. The control instruction is used to instruct the charging circuit 140 to charge the battery unit 120 according to a charging signal output by the external charging device.

In one embodiment, a USB signal in the external charging device is a differential signal, its signal lines are D+, D−, and the D+ or D− of the external charging device is provided with a fixed pull-up or pull-down resistor. The USB1.0/1.1/2.0 protocol defines high- and low-speed devices to meet the needs of different situations. For example, D+ of a high-speed device is connected to a 1.5 kohm pull-up resistor, and D− is not connected, and the opposite is true for a low-speed device. When the interface module 110 is connected to the external charging device, the controller 130 can quickly identify a resistance value of the fixed resistor on the D+ or D− of the external charging device, and then determine whether the external charging device is a fast charging adaptor or not. When the external charging device is the fast charging adaptor, its corresponding charging mode is a fast charging mode. If the external charging device is a normal adaptor, the corresponding charging mode is a normal mode.

Optionally, when the interface module 110 is connected to the external charging device, the controller 130 can perform two-way communication with the external adaptor connected to the interface module 110, and receive an inquiry instruction sent by the external charging device. The inquiry instruction is used to inquire the device for charging control about whether to enable the fast charging mode or not. The controller 130 sends a confirmation instruction to the external charging device based on the inquiry instruction. The confirmation instruction is used to indicate that the device for charging control agrees to enable the fast charging mode, so that the charging mode of the external charging device can be identified.

A charging speed of the fast charging mode is greater than a charging speed of the normal mode. For example, a charging current of the fast charging mode is greater than a charging current of the normal mode. For example, the fast charging mode can be understood as a high current charging mode, that is, the corresponding charging current can be higher than 2.5A, and up to 5-10A. In addition, the fast charging mode is a direct charging mode, and an output voltage of an external charging device can be directly applied to two terminals of the battery unit 120. The normal mode can be understood as a charging mode with a rated output voltage of 5V and a rated output current less than or equal to 2.5A. For example, the fast charging mode may further be a high-voltage fast charging mode, that is, a charging voltage of the fast charging mode is higher than a charging voltage of the normal mode. In other words, the charging voltage of 9V, 15V, 20V, etc. can generally be provided, which is higher than the charging voltage of the normal mode (5V). When the high-voltage fast charging mode is used to power the electronic device, it is necessary to add a step-down circuit for step-down processing to an inside of the electronic device. The step-down circuit can step down the charging voltage of the fast charging mode to a charging voltage suitable for powering the electronic device.

The charging circuit 140 is connected to the controller 130 and the battery unit 120, and is configured to receive the control instruction, so as to charge the battery unit 120 according to the charging signal output by the external charging device.

In one embodiment, when the external charging device is the fast charging adaptor, the controller 130 can identify that its charging mode is the fast charging mode, so as to output a first charging control instruction to the charging circuit 140. The charging circuit 140 can receive a charging voltage provided by the fast charging adaptor and apply the charging voltage directly to two terminals of the plurality of battery cells connected in series in the battery unit 120 to directly charge the plurality of battery cells.

It is noted that the terms "direct", "direct charging", and "direct applying" used in the present disclosure mean that the charging voltage from a fast charging charger or a fast charging adaptor can match an output voltage of the battery unit 120. Or, it means that the charging voltage from the fast charging charger or fast charging adaptor can be applied to the two terminals of the plurality of battery cells for charging without voltage conversion. "Match" can be understood as that the charging voltage of the fast charging adaptor can be equal to the output voltage of the battery unit 120, or a difference between the charging voltage of the fast charging adaptor and the output voltage of the battery unit 120 can be within a preset floating range, for example, within tens of millivolts.

When the external charging device is the normal adaptor, the controller 130 can identify that its charging mode is the normal mode, so as to output a second charging control instruction to the charging circuit 140. The charging circuit 140 can receive a charging voltage provided by the normal adaptor and convert the charging voltage so as to provide a charging voltage suitable for charging the plurality of battery cells. For example, by adding a voltage conversion circuit (step-down circuit or step-up circuit), an output voltage provided by the normal adaptor can be converted into the charging voltage suitable for charging the plurality of battery cells, and the converted charging voltage is applied to the two terminals of the plurality of battery cells.

The voltage dividing circuit 150 is connected in series with the battery unit 120 and is configured to divide the output voltage of the battery unit 120 to obtain a power supply voltage suitable for powering the electronic device.

The voltage dividing circuit 150 includes a voltage divider circuit, and input terminals of the voltage divider circuit may be connected in series with the battery unit 120. That is, the battery unit 120 includes the plurality of battery cells connected in series. A number of the battery cells is N, and each of the battery cells includes a positive electrode and a negative electrode. A first input terminal of the voltage divider circuit can be connected to a positive electrode of a first battery cell, a second input terminal of the voltage divider circuit can be connected to a negative terminal of an Nth battery cell, and an output terminal of the voltage divider circuit can be connected to the system to be powered of the electronic device. The voltage divider circuit is configured to convert the output voltage of the battery unit 120 into the power supply voltage. The power supply voltage is one Nth (1/N) times the output voltage, here N is a number of the battery cells currently powering the electronic device.

Figure 2:
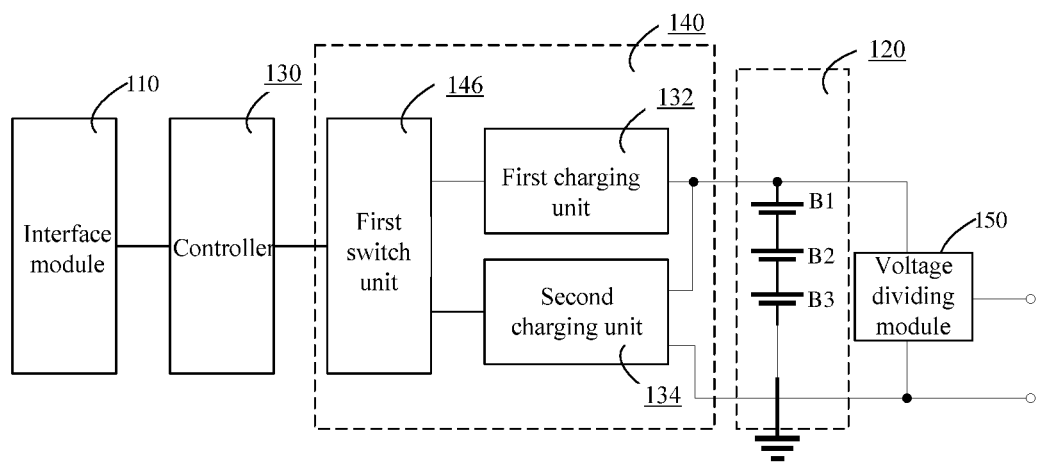
FIG. 2 is a structural schematic diagram of a device for charging control according to one embodiment of the present disclosure.

For example, if currently the battery unit 120 includes battery cells connected in series, referring to FIG. 2, which are B1, B2, and B3, respectively, then a discharge voltage can be changed to one-third of a total voltage discharged by the three battery cells connected in series after a voltage dividing process (⅓ divider) is performed by the voltage divider circuit. As a result, power is supplied to the system to be powered of the electronic device. If currently the battery unit 120 includes battery cells connected in series, referring to FIG. 3, which are B1, B2, B3 and B4, respectively, then a discharge voltage can be changed to one-fourth of a total voltage discharged by the four battery cells connected in series after a voltage dividing process (¼ divider) is performed by the voltage divider circuit. As a result, power is supplied to the system to be powered of the electronic device.

The output terminal of the voltage divider circuit can be connected to the system to be powered of the electronic device, and is configured to convert the output voltage of the battery unit 120 into the power supply voltage. The power supply voltage may further be a voltage required by the system to be powered, that is, the voltage divider circuit can convert the output voltage of the battery unit 120 according to a voltage requirement of each module of the system to be powered. Different modules in the system to be powered require different voltages. For example, a required voltage may be 3.3V, 1.5V, and so on.

The voltage divider circuit may be a charge pump having a voltage dividing or step-down function, a voltage divider module composed of a plurality of resistors, a step-down converter, and the like. In the present disclosure, a specific form of the voltage divider circuit is not limited.

N is the number of the battery cells currently powering the electronic device, which can be understood as a number of the battery cells currently in a working state. For example, a total number of the battery cells in the battery unit 120 is M, however, the number of the battery cells currently in the working state, that is, the battery cells that can supply power to the electronic device is N, here N is less than or equal to M.

The above device for charging control including the interface module 110, the battery unit 120, the controller 130, the charging circuit 140 and the voltage dividing circuit 150 can identify the charging mode of the external charging device connected to the interface module 110 to further control the charging circuit 140 to charge the battery unit 120 according to the charging signal provided by the external charging device, and then utilize the voltage dividing circuit 150 to convert the discharge voltage of the battery unit 120 into the power supply voltage capable of powering the electronic device. Power can be supplied to the system to be powered in the electronic device, the problem of multi-cell power supply for the electronic device can be resolved, and the efficiency of powering the electronic device is improved.

Figure 3:
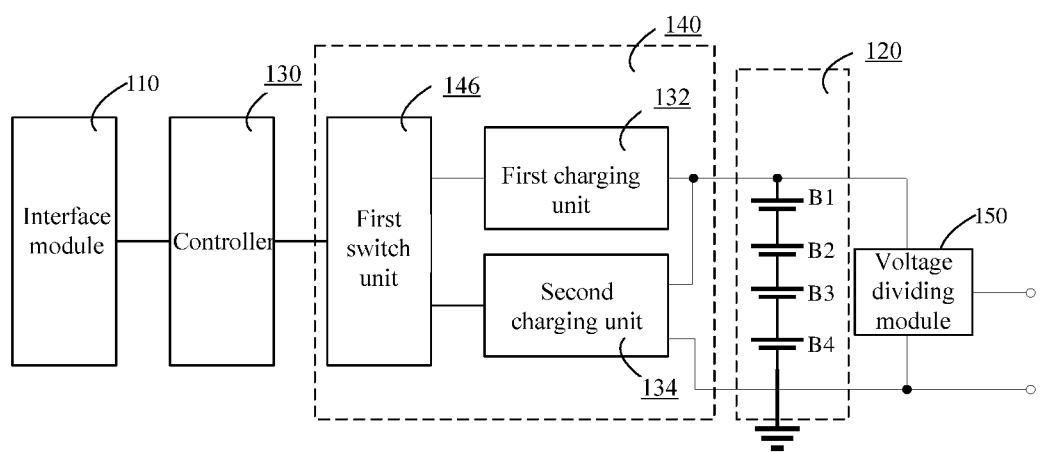
FIG. 3 is a structural schematic diagram of a device for charging control according to one embodiment of the present disclosure.

A description is provided with reference to FIG. 2 and FIG. 3. The charging circuit 140 includes a first charging unit 132, a second charging unit 134 and a first switch unit 146. The first charging unit 132 is connected to the interface module 110 and the battery unit 120, the second charging unit 134 is connected to the interface module 110 and the battery unit 120, the first switch unit 146 is connected to the controller 130, the first charging unit 132 and the second charging unit 134.

The controller 130 can identify the charging mode of the external charging device connected to the interface module 110. The charging mode includes the fast charging mode or the normal mode.

When the charging mode is the fast charging mode, the controller 130 sends a first control instruction, and the first control instruction is used to control the first switch unit 146 to conduct a first path constituted by the interface module 110 and the first charging unit 132. That is, the first charging unit 132 is in a charging state, and can directly charge the battery unit 120 at a first charging speed according to the charging signal output by the external charging device.

The charging signal received by the first charging unit 132 is a-pulsed direct current signal or a pulsed alternating current signal. That is, the external charging device can adopt a constant current charging mode based on the first charging unit 132, that is, use a constant current to charge the charging unit.

When the charging mode is the normal mode, the controller 130 sends a second control instruction, and the second control instruction is used to control the first switch unit 146 to conduct a second path constituted by the interface module 110 and the second charging unit 134. That is, the second charging unit 134 is in a working state, and can charge the battery unit 120 at a second charging speed according to the charging signal of the external charging device. The first charging speed is greater than the second charging speed.

The second charging unit 134 includes a step-up circuit, an input terminal of the step-up circuit is connected to the interface module 110, and an output terminal of the step-up circuit is connected to the battery unit 120.

The charging signal received by the second charging unit 134 is a voltage signal. That is, the charging voltage output by the normal adaptor cannot directly charge the battery unit 120, and the charging voltage output by the normal adaptor needs to be stepped up by the step-up circuit included in the second charging unit 134, so as to obtain a charging voltage suitable for charging the battery unit 120 to charge the plurality of battery cells connected in series. The charging voltage output by the normal adaptor is 5V. However, a range of a charging voltage required by each of the battery cells is 2.2-4.5V, that is, the charging voltage output by the normal adaptor is 5V, which is less than a total voltage of the plurality of battery cells connected in series. When a voltage of the battery cell is 4V, a total charging voltage required is greater than 12V if three battery cells are connected in series. If four battery cells are connected in series, a total charging voltage required is greater than 16V. In other words, the total charging voltage is greater than a sum of the voltage of each of the battery cells. Through the step-up circuit, the charging voltage output by the normal adaptor (for example, 5V) can be stepped up and converted into a charging voltage (12V) suitable for charging the battery unit 120 (three battery cells connected in series). The charging voltage is greater than the sum of the voltages of all the battery cells connected in series in the battery unit 120.

For example, the step-up circuit may adopt a Boost circuit, and may further adopt a charge pump for step-up processing.

In one embodiment, there may be multiple types of the first switch unit 146. The first switch unit 146 can have two power output terminals, and the first switch unit 146 can control power output to two different power output terminals. A switch having two power output terminals may be a single-pole double-throw switch, a relay, and the like. Optionally, the first switch unit 146 may further include a plurality of electronic switches, for example, at least one of a diode, a triode, a relay, a thyristor, a silicon control rectifier, a MOS transistor and an IGBT. By controlling turning on or turning off of the electronic switches, the first path or the second path is conducted.

According to the present embodiment, the controller 130 can identify the charging mode of the external charging device connected to the interface module 110. When the charging mode is the fast charging mode, the first charging unit 132 can be automatically selected to directly charge the battery unit 120 so as to improve charging efficiency. Or, when the charging mode is the normal mode, the second charging unit 134 can be automatically selected to charge the battery unit 120 after the step-up process, so that the normal adaptor can be used to charge the plurality of battery cells connected in series. That is, different charging units can be adaptively selected to charge the plurality of battery cells at the same time, which improves the charging efficiency.

Figure 4:
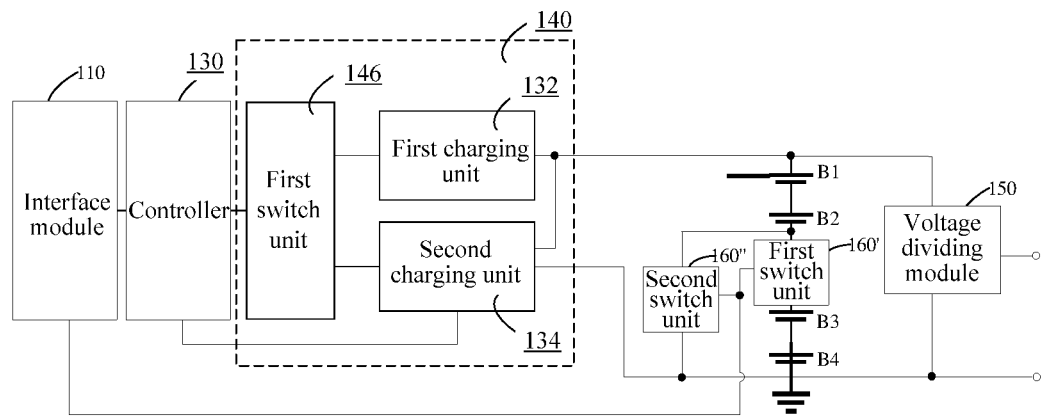
FIG. 4 is a structural schematic diagram of a device for charging control according to one embodiment of the present disclosure.

As shown in FIG. 4, the device for charging control further includes a plurality of second switch units 160. The plurality of second switch units 160 are connected to the charging circuit 140 and the battery unit 120. The plurality of second switch units 160 are connected to the plurality of battery cells to form a plurality of charging branches, which are configured to turn on or turn off a charging branch where one of the battery cells is located according to a switching instruction. The charging branch at least includes two of the battery cells.

When it is necessary to charge the plurality of battery cells of the battery unit 120, the controller 130 can send the switching instruction to control a number of the battery cells currently in the charging state through controlling turning on or turning off of the plurality of second switch units 160. For example, if the number of the battery cells connected in series in the battery unit 120 is four, the plurality of second switch units 160 can be controlled to turn on or turn off to form the plurality of charging branches. One charging branch may include two battery cells, one charging branch may include three battery cells, or one charging branch may include four battery cells. The battery cells included in the charging branch are all in the charging state, whereas the remaining battery cells that are not present in the charging branch are in a non-charging state. The second charging unit 134 can charge at least two battery cells in the charging state in the charging branch. For example, if the number of the battery cells connected in series in the battery unit 120 is four, and they are respectively denoted as B1, B2, B3, and B4, the controller 130 can control the turning on or turning off of the plurality of second switch units 160 so as to form one charging branch (that is, control a second switch unit 160' to turn off and control a second switch unit 160" to turn on), and this charging branch includes the battery cells B1, B2. In other words, the battery cells B1, B2 are in the charging state, whereas the battery cells B3, B4 are in the non-charging state. When the second charging unit 134 is the charging unit that perform charging, the battery cells B1, B2 in the charging branch can be charged.

When the interface module 110 and the second charging unit 134 form the second path, the controller 130 is further connected to the second charging unit 134 and is configured to receive the charging voltage provided by the second charging unit 134 for charging the battery unit 120, and the switching instruction is sent according to the charging voltage.

The controller 130 can receive the step-up charging voltage after being processed by the second charging unit 134, and send the corresponding switching instruction according to the charging voltage. The switching instruction is used to control the turning on or turning off of the plurality of second switch units 160 to determine the number of the battery cells connected in series in the charging branch. For example, when the charging voltage is within a first preset range, it can be determined that the number of the battery cells connected in series in the charging branch is two. When the charging voltage is within a second preset range, it can be determined that the number of the battery cells connected in series in the charging branch is three. When the charging voltage is within a third preset range, it can be determined that the number of the battery cells connected in series in the charging branch is four, and so forth. The first preset range, the second preset range and the third preset range increase sequentially.

When a capacity of the battery cells in the charging branch reaches a threshold value, the controller 130 can also send turn-on and turn-off instructions correspondingly to control the turning on and turning off of the plurality of second switch units 160, so that the battery cells in the non-charging state can be in the charging state and the battery cells in the charging state can be in the non-charging state. As a result, a new charging branch is constituted.

Each preset range may be divided based on at least one factor of the charging voltage, the voltage of each of the battery cells, and the number of the battery cells in the battery unit 120. At the same time, the number of the battery cells in the charging branch corresponding to the each preset range may be set depending on practical needs. In the present disclosure, the division of the each preset range and the branch formed by connecting the battery cells in series corresponding to the each preset range are not limited.

In the present embodiment, the turning on and turning off of the plurality of second switch units 160 can be controlled according to a magnitude of the charging voltage, thus controlling the number of the battery cells connected in series in the thus formed charging branch. As a result, all the battery cells in the battery unit 120 can be charged in batches to provide charging efficiency. At the same time, the efficiency of power supply for the electronic device can be improved.

Figure 5:
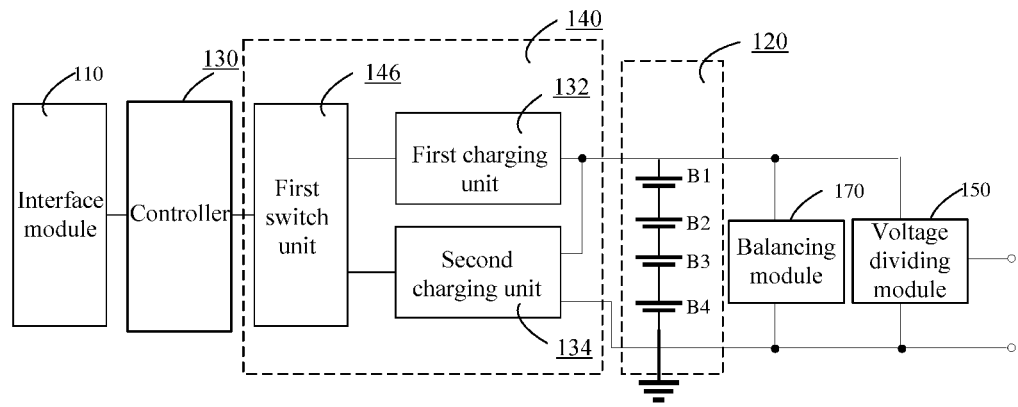
FIG. 5 is a structural schematic diagram of a device for charging control according to one embodiment of the present disclosure.

As shown in FIG. 5, the device further includes a balancing module 170 connected to the battery unit 120, and is configured to balance the voltage signals among the plurality of battery cells.

The balancing module 170 includes a plurality of balancing units, and the balancing units are connected in series with the battery cells, respectively. That is, one battery cell corresponds to one balancing unit. The balancing unit may adopt a balancing method of capacitive balance, inductive balance, or transformer-based balance to balance the voltage signals among the plurality of battery cells.

In the present embodiment, in order to achieve better advantages of the plurality of battery cells connected in series, such as discharging more capacity and having a longer service life, the balancing module 170 can be used to let the voltages and currents among the battery cells to be effectively and timely balanced so as to improve the overall performance of the plurality of battery cells and facilitate the unified management of the plurality of battery cells.

When the device for charging control charges the battery unit 120, it can control the turning on and turning off of the plurality of second switch units 160 according to the magnitude of the charging voltage, thus controlling the number of the battery cells connected in series in the thus formed charging branch. If the number of the battery cells in the charging branch is less than the total number of all the battery cells in the battery unit 120, the balancing module 170 can also utilize the active balancing method to transfer part of energy of the battery cells having a high voltage to the battery cells having a low voltage. As a result, the occurrence that the minimum cell voltage triggers discharging is delayed to realize the balancing processing.

Figure 6:
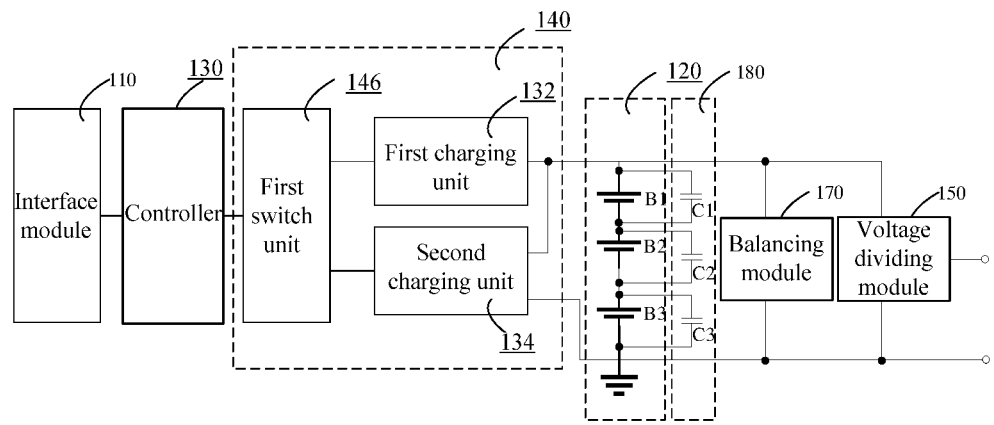
FIG. 6 is a structural schematic diagram of a device for charging control according to one embodiment of the present disclosure.

As shown in FIG. 6, in one embodiment, the device for charging control further includes an energy storage module 180 connected in parallel with the battery unit 120, and is configured to store part of electric energy of the battery unit 120, so as to maintain the battery unit 120 to normally supply power to the electronic device when the electronic device draws a preset current signal.

In one embodiment, the energy storage module 180 includes a supercapacitor. The supercapacitor is also called a double electric layer capacitor, a gold capacitor or a super capacitor. Farah capacitors use polarized electrolytes to store energy, but no chemical reactions occur, and the energy storage process is reversible. It is also because supercapacitors can be repeatedly charged and discharged hundreds of thousands of times, supercapacitors have a larger capacitance than ordinary capacitors, and their maximum capacity can reach thousands of farads. By using its characteristics, a stable voltage output can be provided. When the electronic device needs a large current in an instant, the supercapacitor can generate a large discharge current instantly to meet the power demand of the electronic device, which improves the performance of the electronic device, and avoids the drastic change in an output current of the battery unit 120 to extend the life of the battery unit 120.

In one embodiment, a number of supercapacitors included in the energy storage module 180 may be one or more. A plurality of supercapacitors may be connected in parallel or connected in series. For example, the energy storage module 180 may be connected in parallel with the battery unit 120. The energy storage module 180 may further be connected to the voltage dividing circuit 150, that is, it may be disposed at two terminals of the voltage dividing circuit 150. In other words, it may be disposed at an input terminal of the system to be powered of the electronic device.

In one embodiment, the number of the supercapacitors included in the energy storage module 180 may be more than one. The number of the supercapacitors is the same as the number of the battery cells, and one supercapacitor is connected in parallel with one battery cell correspondingly.

As the internal resistance of the lithium battery will increase in low temperature conditions or after long-term use, at this time if the voltage of the battery cell is relatively low and the electronic device draws a large current (large short-term current), the voltage of the battery cell will drop sharply due to the large internal resistance of the battery cell. If it drops below the voltage threshold at which the electronic device can work normally, the electronic device will suddenly turn off and some user data cannot be saved.

In the present embodiment, the supercapacitor and the battery cell (lithium battery) are connected in parallel, and the supercapacitor has characteristics of good ultra-low temperature performance, low impedance, etc. When the electronic device needs to draw a large current (large short-term current), the voltage can be maintained without a drastic drop, so that the turn-off voltage point and low temperature turn-off point of the electronic device can be set lower, thus avoiding waste of battery capacity and occurrence of automatic turning off of the electronic device at a low temperature.

Figure 7:
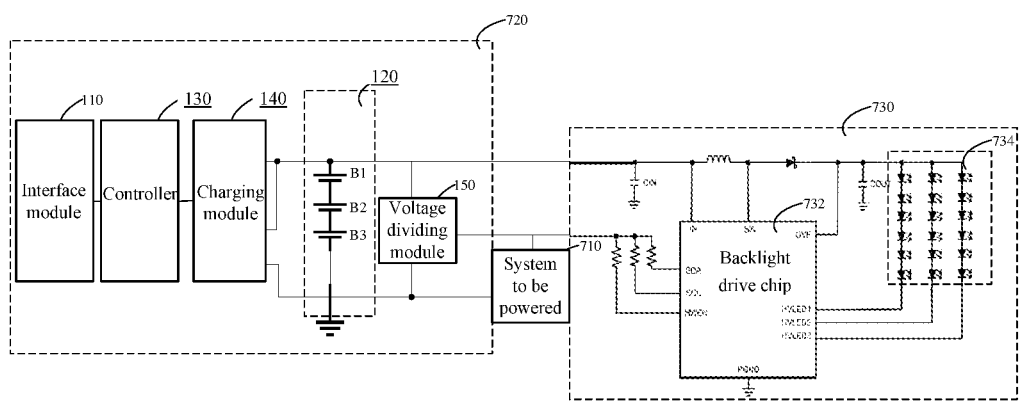
FIG. 7 is a structural schematic diagram of an electronic device according to one embodiment of the present disclosure.

As shown in FIG. 7, the present disclosure further provides an electronic device including a system to be powered 710 and further including a device for charging control 720 according to any of the above embodiments. The device for charging control 720 is configured to supply power to the system to be powered 710.

An output terminal of the device for charging control 720 is connected to an input terminal of the system to be powered 710 of the electronic device, and is configured to supply power to the system to be powered 710. The system to be powered 710 can be understood as all elements or modules, systems, etc., constituted by elements in the electronic device that need electric power support to run. The system to be powered 710 is not limited in the present disclosure.

The above device for charging control 720 can convert a voltage of a plurality of battery cells in the battery unit 120 into a power supply voltage suitable for powering the system to be powered 710, which realizes the feasibility of using multiple battery cells to supply power to the electronic device.

As shown in FIG. 7, in one embodiment, the electronic device further includes a backlight drive module 730. The backlight drive module 730 is connected to a positive output terminal of the battery unit 120 and configured to receive an output voltage of a charging unit to drive the backlight drive module 730.

In one embodiment, the backlight drive module 730 includes a backlight drive chip 732 and a light emitting module 734 connected to the backlight drive chip 732. A drive voltage of the backlight drive chip 732 is relatively high (for example, 16V, 18V), and the backlight drive chip 732 can only be driven to control the light emitting module 734 to emit light under the driving of the drive voltage.

In the present embodiment, the battery unit 120 includes a plurality of battery cells connected in series (for example, three battery cells connected in series or four battery cells connected in series), and a total voltage output by the battery unit 120 is a sum of voltages of the plurality of battery cells connected in series. For example, if the output voltage of one battery cell is 4V and the total voltage output by the four battery cells connected in series is 16V, it is only necessary to increase the total voltage that is output to the drive voltage, and then the backlight drive chip 732 can be driven to control the light emitting module 734 to emit light. As compared with the situation of using a single battery cell, in which the output voltage (4V) needs to be increased to the drive voltage, and there is a relatively large voltage difference that makes the conversion efficiency of the backlight drive chip 732 lower. In the present embodiment, a difference between the total voltage output by the battery unit 120 and the drive voltage is smaller, which reduces the voltage difference between the total voltage that is output and the drive voltage, thus improving the conversion efficiency of the backlight drive chip 732.

The present disclosure further provides a method for charging control applied to a device for charging control. The device for charging control includes an interface module configured to be connected to an external charging device, a battery unit including a plurality of battery cells connected in series, a charging circuit and a voltage dividing circuit. The charging circuit is connected to the interface module and the battery unit, and is configured to charge the battery unit according to a charging signal output by the external charging device. The voltage dividing circuit is connected in series with the battery unit, and is configured to divide an output voltage of the battery unit to obtain a power supply voltage suitable for powering the electronic device.

Figure 8:
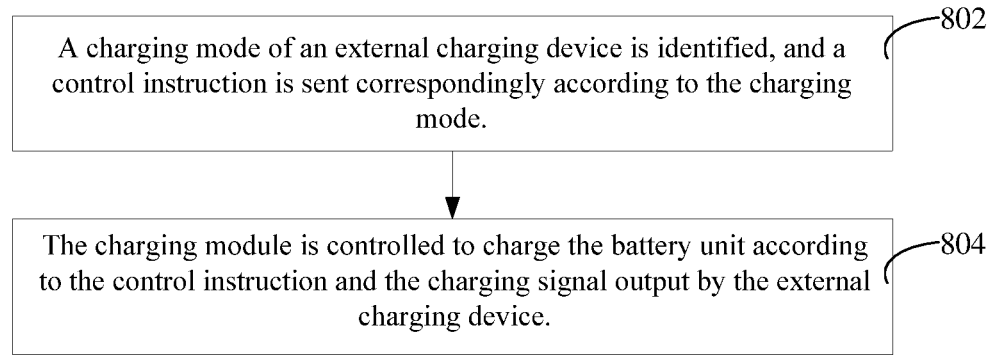
FIG. 8 is a flowchart of a method for charging control according to one embodiment of the present disclosure.

FIG. 8 is a flowchart of a method for charging control according to one embodiment of the present disclosure. The method for charging control according to the present embodiment is described by taking an example of running on the electronic device in FIG. 7. As shown in FIG. 8, the method for charging control includes steps 802 to 804.

Block 802: A charging mode of an external charging device is identified, and a control instruction is sent correspondingly according to the charging mode.

When an interface module of an electronic device is connected to the external charging device, the charging mode of the external charging device can be identified, and the corresponding control instruction can be sent according to the identified charging mode. The control instruction is used to instruct a charging circuit to charge a battery unit according to a charging signal output by the external charging device.

In one embodiment, a USB signal in the external charging device is a differential signal, its signal lines are D+, D−, and the D+ or D− of the external charging device is provided with a fixed pull-up or pull-down resistor. The USB1.0/1.1/2.0 protocol defines high- and low-speed devices to meet the needs of different situations. For example, D+ of a high-speed device is connected to a 1.5 kohm pull-up resistor, and D− is not connected, and the opposite is true for a low-speed device. When the interface module is connected to the external charging device, a resistance value of the fixed resistor on the D+ or D− of the external charging device can be quickly identified, and then whether the external charging device is a fast charging adaptor or not is determined. When the external charging device is the fast charging adaptor, its corresponding charging mode is a fast charging mode. If the external charging device is a normal adaptor, the corresponding charging mode is a normal mode.

Optionally, when the interface module is connected to the external charging device, two-way communication can be performed with the external adaptor connected to the interface module. Through receiving an inquiry instruction sent by the external charging device. the inquiry instruction is used to inquire the device for charging control about whether to enable the fast charging mode or not. A confirmation instruction is sent to the external charging device based on the inquiry instruction. The confirmation instruction is used to indicate that the device for charging control agrees to enable the fast charging mode, so that the charging mode of the external charging device can be identified.

A charging speed of the fast charging mode is greater than a charging speed of the normal mode. For example, a charging current of the fast charging mode is greater than a charging current of the normal mode. For example, the fast charging mode can be understood as a high current charging mode, that is, the corresponding charging current can be higher than 2.5A, and up to 5-10A. In addition, the fast charging mode is a direct charging mode, and an output voltage of an external charging device can be directly applied to two terminals of the battery unit. The fast charging mode may further be a high-voltage fast charging mode, that is, a charging voltage of the fast charging mode is higher than a charging voltage of the normal mode. In other words, the charging voltage of 9V, 15V, 20V, etc. can generally be provided, which is higher than the charging voltage of the normal mode (5V). When the high-voltage fast charging mode is used to power the electronic device, it is necessary to add a step-down circuit for step-down processing to an inside of the electronic device. The step-down circuit can step down the charging voltage of the fast charging mode to a charging voltage suitable for powering the electronic device.

The normal mode can be understood as a charging mode with a rated output voltage of 5V and a rated output current less than or equal to 2.5A.

Block 804: The charging circuit is controlled to charge the battery unit according to the control instruction and the charging signal output by the external charging device.

In one embodiment, when the external charging device is the fast charging adaptor, its charging mode can be identified as the fast charging mode, so as to output a first charging control instruction to the charging circuit. The charging circuit can receive a charging voltage provided by the fast charging adaptor and apply the charging voltage directly to two terminals of the plurality of battery cells connected in series in the battery unit to directly charge the plurality of battery cells.

The terms "direct", "direct charging", and "direct applying" used in the present disclosure mean that the charging voltage from a fast charging charger or a fast charging adaptor can match an output voltage of the battery unit. Or, it means that the charging voltage from the fast charging charger or fast charging adaptor can be applied to the two terminals of the plurality of battery cells for charging without voltage conversion. "Match" can be understood as that the charging voltage of the fast charging adaptor can be equal to the output voltage of the battery unit, or a difference between the charging voltage of the fast charging adaptor and the output voltage of the battery unit can be within a preset floating range, for example, within tens of millivolts.

In one embodiment, when the external charging device is the normal adaptor, its charging mode can be identified as the normal mode, so as to output a second charging control instruction to the charging circuit. The charging circuit can receive a charging voltage provided by the normal adaptor and convert the charging voltage so as to provide a charging voltage suitable for charging the plurality of battery cells. For example, by adding a voltage conversion circuit (step-down circuit or step-up circuit), an output voltage provided by the normal adaptor can be converted into the charging voltage suitable for charging the plurality of battery cells, and the converted charging voltage is applied to the two terminals of the plurality of battery cells.

In one embodiment, the charging circuit includes a first charging unit, a second charging unit and a first switch unit.

Identifying the charging mode of the external charging device, and sending the control instruction correspondingly according to the charging mode includes sending a first control instruction when the charging mode is the fast charging mode, and the first control instruction being used to control the first switch unit to conduct a first path constituted by the interface module and the first charging unit.

In one embodiment, when the charging mode is the fast charging mode, the first control instruction is sent. The first control instruction is used to control the first switch unit to conduct the first path constituted by the interface module and the first charging unit. That is, the first charging unit is in a charging state, and can directly charge the battery unit at a first charging speed according to the charging signal output by the external charging device.

In one embodiment, the charging signal received by the first charging unit is a pulsed direct current signal or a pulsed alternating current signal. The first charging unit may further adopt a constant current charging mode, that is, a constant current is used to charge a charging unit.

When the charging mode is the normal mode, a second control instruction is sent. The second control instruction is used to control the first switch unit to conduct a second path constituted by the interface module and the second charging unit.

When the charging mode is the normal mode, the second control instruction is sent. The second control instruction is used to control the first switch unit to conduct the second path constituted by the interface module and the second charging unit. That is, the second charging unit is in a working state, and the battery unit can be charged at a second charging speed according to the charging signal of the external charging device. The first charging speed is greater than the second charging speed.

The second charging unit includes a step-up circuit, an input terminal of the step-up circuit is connected to the interface module, and an output terminal of the step-up circuit is connected to the battery unit.

The charging signal received by the second charging unit is a voltage signal. That is, the charging voltage output by the normal adaptor cannot directly charge the battery unit, and the charging voltage output by the normal adaptor needs to be stepped up by the step-up circuit included in the second charging unit, so as to obtain a charging voltage suitable for charging the battery unit to charge the plurality of battery cells connected in series. The charging voltage output by the normal adaptor is 5V. However, a range of a charging voltage required by each of the battery cells is 2.2-4.5V, that is, the charging voltage output by the normal adaptor is 5V, which is less than a total voltage of the plurality of battery cells connected in series. When a voltage of the battery cell is 4V, a total charging voltage required is greater than 12V if three battery cells are connected in series. If four battery cells are connected in series, a total charging voltage required is greater than 16V. In other words, the total charging voltage is greater than a sum of the voltage of each of the battery cells. Through the step-up circuit, the charging voltage output by the normal adaptor (for example, 5V) can be stepped up and converted into a charging voltage (12V) suitable for charging the battery unit (three battery cells connected in series). The charging voltage is greater than the sum of the voltages of all the battery cells connected in series in the battery unit.

For example, the step-up circuit may adopt a Boost circuit, and may further adopt a charge pump for step-up processing.

In one embodiment, there may be multiple types of the first switch unit. The first switch unit can have two power output terminals, and the first switch unit can control power output to two different power output terminals. A switch having two power output terminals may be a single-pole double-throw switch, a relay, and the like. Optionally, the first switch unit may further include a plurality of electronic switches, for example, at least one of a diode, a triode, a relay, a thyristor, a silicon control rectifier, a MOS transistor and an IGBT. By controlling turning on or turning off of the electronic switches, the first path or the second path is conducted.

According to the present embodiment, the charging mode of the external charging device connected to the interface module can be identified. When the charging mode is the fast charging mode, the first charging unit can be automatically selected to directly charge the battery unit so as to improve charging efficiency. Or, when the charging mode is the normal mode, the second charging unit can be automatically selected to charge the battery unit after the step-up process, so that the normal adaptor can be used to charge the plurality of battery cells connected in series. That is, different charging units can be adaptively selected to charge the plurality of battery cells at the same time, which improves the charging efficiency.

In one embodiment, the device for charging control further includes a plurality of second switch units connected to the battery unit. The plurality of second switch units are connected to the plurality of battery cells to form a plurality of charging branches.

The method for charging control further includes sending a switching instruction when the first switch unit conducts the second path constituted by the interface module and the second charging unit; and turning on or turning off a charging branch where one of the battery cells is located according to the switching instruction, the charging branch at least including two of the battery cells.

When it is necessary to charge the plurality of battery cells of the battery unit, the switching instruction can be sent to control a number of the battery cells currently in the charging state through controlling turning on or turning off of the plurality of second switch units. For example, if the number of the battery cells connected in series in the battery unit is four, the plurality of second switch units can be controlled to turn on or turn off to form the plurality of charging branches. One charging branch may include two battery cells, one charging branch may include three battery cells, or one charging branch may include four battery cells. The battery cells included in the charging branch are all in the charging state, whereas the remaining battery cells that are not present in the charging branch are in a non-charging state. The second charging unit can charge at least two battery cells in the charging state in the charging branch. For example, if the number of the battery cells connected in series in the battery unit is four, and they are respectively denoted as B1, B2, B3, and B4, the turning on or turning off of the plurality of second switch units can be controlled so as to form one charging branch (that is, control the second switch unit 160' in FIG. 4 to turn off and control the second switch unit 160" in FIG. 4 to turn on), and this charging branch includes the battery cells B1, B2. In other words, the battery cells B1, B2 are in the charging state, whereas the battery cells B3, B4 are in the non-charging state. When the second charging unit is the charging unit that perform charging, the battery cells B1, B2 in the charging branch can be charged.

In one embodiment, the electronic device may receive the step-up charging voltage after being processed by the second charging unit, and send the corresponding switching instruction according to the charging voltage. The switching instruction is used to control the turning on or turning off of the plurality of second switch units to determine the number of the battery cells connected in series in the charging branch. For example, when the charging voltage is within a first preset range, it can be determined that the number of the battery cells connected in series in the charging branch is two. When the charging voltage is within a second preset range, it can be determined that the number of the battery cells connected in series in the charging branch is three. When the charging voltage is within a third preset range, it can be determined that the number of the battery cells connected in series in the charging branch is four, and so forth. The first preset range, the second preset range and the third preset range increase sequentially.

When a capacity of the battery cells in the charging branch reaches a threshold value, turn-on and turn-off instructions can also be sent correspondingly to control the turning on and turning off of the plurality of second switch units, so that the battery cells in the non-charging state can be in the charging state and the battery cells in the charging state can be in the non-charging state. As a result, a new charging branch is constituted.

Each preset range may be divided based on at least one factor of the charging voltage, the voltage of each of the battery cells, and the number of the battery cells in the battery unit. At the same time, the number of the battery cells in the charging branch corresponding to the each preset range may be set depending on practical needs. In the present disclosure, the division of the each preset range and the branch formed by connecting the battery cells in series corresponding to the each preset range are not limited.

In the present embodiment, the turning on and turning off of the plurality of second switch units can be controlled according to a magnitude of the charging voltage, thus controlling the number of the battery cells connected in series in the thus formed charging branch. As a result, all the battery cells in the battery unit can be charged in batches to provide charging efficiency. At the same time, the efficiency of power supply for the electronic device can be improved.

Although the various steps in the flowchart of FIG. 8 are displayed in sequence as indicated by the arrows, these steps are not necessarily performed in sequence in the order indicated by the arrows. Unless otherwise stated, there is no strict limitation on the order of performing these steps, and these steps can be performed in other orders. In addition to that, at least part of the steps in FIG. 8 may include multiple sub-steps or multiple stages. These sub-steps or stages are not necessarily performed at a same time point, but can be performed at different time points. These sub-steps or stages are also not necessarily performed sequentially, but may be performed in turns or alternately with other steps or at least part of the sub-steps or stages of other steps.

One embodiment of the present disclosure further provides a computer-readable storage medium. One or more non-volatile computer-readable storage medium including a computer-executable instruction. When the computer-executable instruction is executed by one or more processors, the processors are caused to perform steps of a method for charging control.

A computer program product including an instruction, when being run on a computer, causes the computer to perform a method for charging control.

Figure 9:
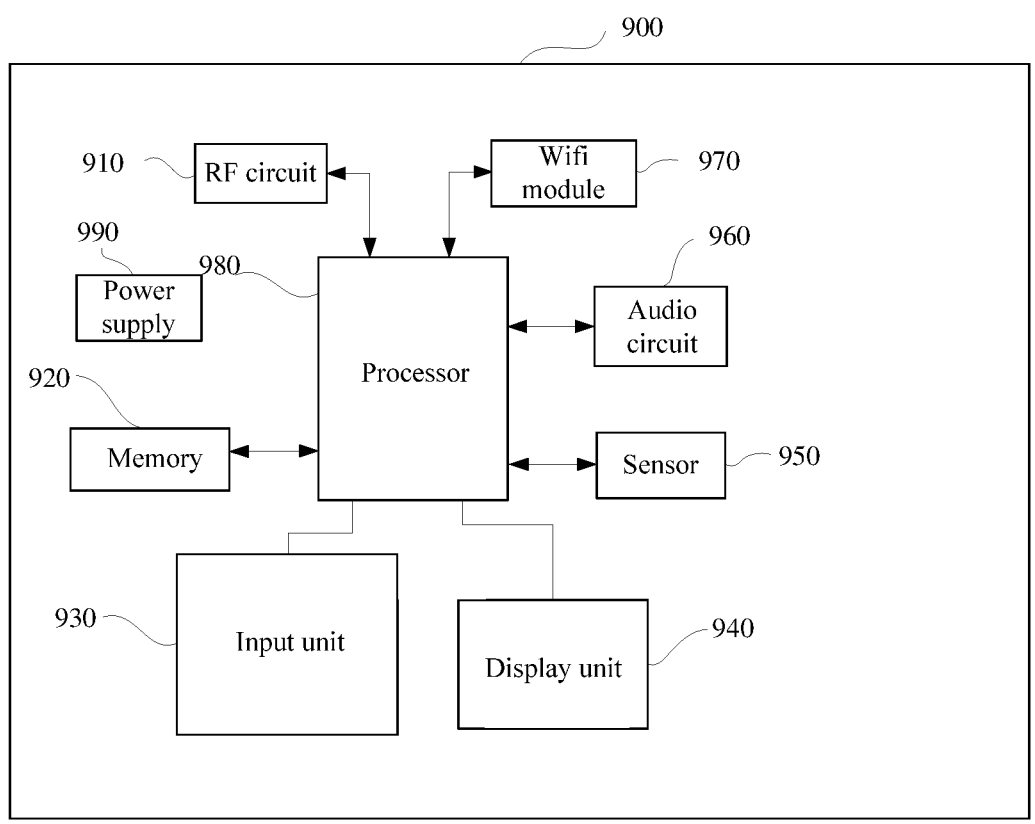
FIG. 9 is a block diagram of a partial structure of a mobile phone related to an electronic device provided by an embodiment of the present disclosure.

One embodiment of the present disclosure further provides an electronic device. As shown in FIG. 9, for ease of description, only the parts relevant to the embodiment of the present disclosure are shown. For specific technical details that are not disclosed, please refer to the method embodiment(s) of the present disclosure. The electronic device may be any terminal device including a mobile phone, a tablet computer, a personal digital assistant (PDA), a point of sales (POS), an in-vehicle computer, a wearable device, or the like. Take the electronic device as a mobile phone for example.

FIG. 9 is a block diagram of a partial structure of a mobile phone related to an electronic device provided by an embodiment of the present disclosure. A description is provided with reference to FIG. 9. The mobile phone includes components including a radio frequency (RF) circuit 910, a memory 920, an input unit 930, a display unit 940, a sensor 950, an audio circuit 960, a wireless fidelity (WiFi) module 970, a processor 980, and a power supply 990, etc. Those skilled in the art would understand that the mobile phone is not limited to the structure of the mobile phone shown in FIG. 9, and may include more or fewer components than those shown in the figure, or a combination of some components, or different component arrangements.

As shown in FIG. 5, the mobile terminal 900 may include components, such as a radio frequency (RF) circuit 910, a memory 920 including one or more (only one is shown in the figure) computer-readable storage media, an input unit 930, a display unit 940, a sensor 950, an audio circuit 960, a WiFi module 970, a processor 980 including one or more (only one is shown in the figure) processing cores, and a power supply 190, etc. Those skilled in the art would understand that the mobile terminal 900 is not limited to the structure of the mobile terminal 900 shown in FIG. 5. The mobile terminal 900 may include more or less components than those illustrated in the figure, or some components may be combined, or the mobile terminal 900 may have different component arrangements.

The RF circuit 910 may be configured to receive and send a signal during an information receiving and sending process or a conversation process. Specifically, after receiving downlink information from a base station, the RF circuit 910 delivers the downlink information to one or more processors 980 for processing, and sends related uplink data to the base station. Generally, the RF circuit 910 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 910 may also communicate with a network and another device by wireless communication. The wireless communication may use any communications standard or protocol, which includes, but is not limited to, a Global System for Mobile communications (GSM), an Enhanced Data GSM Environment (EDGE), a Wideband Code Division Multiple Access (WCDMA), a Code Division Access (CDMA), a Time Division Multiple Access (TDMA), a Wireless Fidelity (Wi-Fi) such as IEEE 802.11a, IEEE 802.11b, IEEE802.11g and IEEE 802.11n, a Voice over Internet Protocol (VoIP), a Worldwide Interoperability for Microwave Access (Wi-Max), any other protocols for e-mail, instant communication and short message, and the like.

The memory 920 may be configured to store a software program and module. The processor 980 runs the software program and module stored in the memory 920, to implement various functional applications and data processing. The memory 920 may mainly include a program storage area and a data storage area. The program storage area may store an operating system, an application program required by at least one function (such as a sound playback function and an image display function), and the like. The data storage area may store data (such as audio data and an address book) created according to use of the mobile terminal 900, and the like. In addition, the memory 920 may include a high speed random access memory, and may also include a non-volatile memory, such as at least one magnetic disk storage device, a flash memory device, or another volatile solid-state storage device. Correspondingly, the memory 920 may further include a memory controller, so that the processor 980 and the input unit 930 access the memory 920.

The input unit 930 may be configured to receive input digit or character information, and generate keyboard, mouse, joystick, optical, or track ball signal input related to the user setting and function control. Specifically, the input unit 930 may include a touch-sensitive surface 931 and other input device 932. The touch-sensitive surface 931 may also be referred to as a touch screen or a touch panel, and may collect a touch operation of a user on or near the touch-sensitive surface (such as an operation of a user on or near the touch-sensitive surface 931 by using any suitable object or attachment, such as a finger or a stylus), and drive a corresponding connection apparatus according to a preset program. Optionally, the touch-sensitive surface 931 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 980. Moreover, the touch controller can receive and execute a command sent from the processor 980. In addition, the touch-sensitive surface 931 may be implemented by using various types, such as a resistive type, a capacitance type, an infrared type, and a surface sound wave type. In addition to the touch-sensitive surface 931, the input unit 930 may further include the another input device 932. Specifically, the another input device 932 may include, but is not limited to, one or more of a physical keyboard, a functional key (such as a volume control key or a switch key), a track ball, a mouse, and a joystick.

The display unit 940 may be configured to display information input by the user or information provided for the user, and various graphical user ports of the mobile terminal 900. The graphical user ports may be formed by a graph, a text, an icon, a video, and any combination thereof. The display unit 940 may include a display panel 941. Optionally, the display panel 941 may be configured by using a liquid crystal display (LCD), an organic light-emitting diode (OLED), or the like. Further, the touch-sensitive surface 931 may cover the display panel 941. After detecting a touch operation on or near the touch-sensitive surface 931, the touch-sensitive surface 931 transfers the touch operation to the processor 980, so as to determine a type of a touch event. Then, the processor 980 provides corresponding visual output on the display panel 941 according to the type of the touch event. Although, in FIG. 9, the touch-sensitive surface 931 and the display panel 941 are used as two separate parts to implement input and output functions, in some embodiments, the touch-sensitive surface 931 and the display panel 941 may be integrated to implement the input and output functions.

The mobile terminal 900 may further include at least one sensor 950, such as an optical sensor, a motion sensor, and other sensors. Specifically, the optical sensor may include an ambient light sensor and a proximity sensor. The ambient light sensor may adjust luminance of the display panel 941 according to brightness of the ambient light. The proximity sensor may switch off the display panel 941 and/or backlight when the mobile terminal 900 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone attitude (such as switching between horizontal and vertical screens, a related game, and attitude calibration of a magnetometer), a related function of vibration identification (such as a pedometer and a knock). Other sensors, such as a gyroscope, a barometer, a hygrometer, a thermometer, and an infrared sensor, which may be configured in the mobile terminal 900 are not further described herein.

The audio circuit 960, a loudspeaker 961, and a microphone 962 may provide audio interfaces between the user and the mobile terminal 900. The audio circuit 960 may transmit, to the loudspeaker 961, a received electric signal converted from received audio data. The loudspeaker 961 converts the electric signal into a sound signal for output. On the other hand, the microphone 962 converts a collected sound signal into an electric signal. The audio circuit 960 receives the electric signal and converts the electric signal into audio data, and outputs the audio data to the processor 980 for processing. Then, the processor 980 sends the audio data to, for example, another terminal by using the RF circuit 910, or outputs the audio data to the memory 920 for further processing. The audio circuit 960 may further include an earplug jack, so as to provide communication between a peripheral earphone and the mobile terminal 900.

The mobile terminal 900 may help, by using the WiFi module 970, a user to receive and send an e-mail, browse a webpage, and access stream media, and the like, which provides wireless broadband Internet access for the user. Although FIG. 9 shows the WiFi module 970, it may be understood that, the wireless communications unit is not a necessary component of the mobile terminal 900, and can be ignored according to demands without changing the scope of the essence of the present disclosure.

The processor 980 is a control center of the mobile terminal 900, and connects various parts of the terminal by using various interfaces and lines. By running or executing the software program and/or module stored in the memory 920, and invoking data stored in the memory 920, the processor 980 performs various functions and data processing of the mobile terminal 900, thereby performing overall monitoring on the mobile phone. Optionally, the processor 980 may include one or more processing cores. Preferably, the processor 980 may integrate an application processor and a modem. The application processor mainly processes an operating system, a user interface, an application program, and the like. The modem mainly processes wireless communication. It may be understood that, the foregoing modem may not be integrated into the processor 980.

The mobile terminal 900 further includes the power supply 990 (such as a battery) for supplying power to the components. Preferably, the power supply may be logically connected to the processor 980 by using a power supply management system, thereby implementing functions, such as charging, discharging, and power consumption management, by using the power supply management system. The power supply 990 may further include any component, such as one or more direct current or alternate current power supplies, a re-charging system, a power supply fault detection circuit, a power supply converter or an inverter, and a power supply state indicator.

In one embodiment, the mobile terminal 900 may further include a camera and a Bluetooth module.

According to an embodiment of the present disclosure, the mobile terminal further includes a memory and one or more computer programs. The one or one or more computer programs are stored in the memory, and are configured to be executed by one or more processors to perform operations of the method for charging control.

Any reference to memory, storage, database, or other media used in this disclosure may include a non-volatile and/or a volatile memory. The non-volatile memory may include a read only memory (ROM), a programmable ROM (PROM), electrically programmable ROM (EPROM), electrically erasable programmable ROM (EEPROM), or flash memory. Volatile memory may include random access memory (RAM), which acts as external cache memory. The RAM is available in many forms, such as static RAM (SRAM), dynamic RAM (DRAM), synchronous DRAM (SDRAM), double data rate SDRAM (DDR SDRAM), enhanced SDRAM (ESDRAM), synchronous Link (Synchlink) DRAM (SLDRAM), memory bus (Rambus) direct RAM (RDRAM), direct memory bus dynamic RAM (DRDRAM), and memory bus dynamic RAM (RDRAM).

The technical features of the above-mentioned embodiments can be combined arbitrarily. In order to make the description concise, all possible combinations of the various technical features in the above-mentioned embodiments are not described. However, as long as there is no contradiction in the combination of these technical features, all should be considered as the scope of this specification.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A device for charging control configured to power an electronic device, the device comprising:
   an interface module configured to be connected to an external charging device;
   a battery unit comprising a plurality of battery cells connected in series;
   a controller connected to the interface module, and configured to identify a charging mode of the external charging device and send a control instruction correspondingly according to the charging mode;
   a charging circuit connected to the controller and the battery unit and configured to receive the control instruction, so as to charge the battery unit according to a charging signal output by the external charging device, wherein the charging circuit comprises:
     a first charging unit connected to the interface module and the battery unit, and configured to receive the charging signal and directly charge the battery unit at a first charging speed;
     a second charging unit connected to the interface module and the battery unit, and configured to receive the charging signal of the external charging device and charge the battery unit at a second charging speed, wherein the first charging speed is greater than the second charging speed; and
     a first switch unit connected to the controller, the first charging unit and the second charging unit, and configured to receive the control instruction to conduct a first path constituted by the interface module and the first charging unit or conduct a second path constituted by the interface module and the second charging unit;
   a plurality of second switch units connected to the charging circuit and the battery unit, wherein the plurality of second switch units are connected to the plurality of battery cells to form a plurality of charging branches; and
   a voltage dividing circuit connected in series with the battery unit, and configured to divide an output voltage of the battery unit to obtain a power supply voltage suitable for powering the electronic device;
   wherein the controller is further configured to send a switching instruction when the second path constituted by the interface module and the second charging unit is conducted; the second switch units are configured to turn on or turn off a charging branch where one of the battery cells is located according to the switching instruction, the charging branch at least comprises two of the battery cells.

2. The device as claimed in claim 1, wherein the charging mode comprises a fast charging mode or a normal mode, wherein:
   when the charging mode is the fast charging mode, the controller sends a first control instruction, and the first control instruction is used to control the first switch unit to conduct the first path constituted by the interface module and the first charging unit; and
   when the charging mode is the normal mode, the controller sends a second control instruction, and the second control instruction is used to control the first switch unit to conduct the second path constituted by the interface module and the second charging unit.

3. The device as claimed in claim 1, wherein the charging signal received by the first charging unit is a pulsed direct current signal or a pulsed alternating current signal.

4. The device as claimed in claim 1, wherein the second charging unit comprises a step-up circuit, an input terminal of the step-up circuit is connected to the interface module, an output terminal of the step-up circuit is connected to the battery unit, the step-up circuit is configured to receive the charging signal of the external charging device and step up the charging signal to obtain a charging voltage suitable for charging the battery unit.

5. The device as claimed in claim 1, wherein the controller is further connected to the second charging unit, and is configured to receive the charging voltage provided by the second charging unit for the battery unit, and send the switching instruction according to the charging voltage.

6. The device as claimed in claim 1, wherein the voltage dividing circuit comprises a voltage divider circuit, input terminals of the voltage divider circuit are connected to the battery unit, an output terminal of the voltage divider circuit is connected to the electronic device, and the voltage divider circuit is configured to divide the output voltage of the battery unit into the power supply voltage, the power supply voltage is one Nth times the output voltage, wherein N is a number of the battery cells currently powering the electronic device.

7. The device as claimed in claim 1, wherein the device further comprises a balancing module connected to the battery unit, and is configured to balance voltage signals among the plurality of battery cells.

8. The device as claimed in claim 1, wherein the device further comprises an energy storage module connected in parallel with the battery unit, and is configured to store part of electric energy of the battery unit, so as to maintain the battery unit to normally supply power to the electronic device when the electronic device draws a preset current signal.

9. The device as claimed in claim 8, wherein the energy storage module comprises a supercapacitor.

10. An electronic device comprising a system to be powered, further comprising a device for charging control, the device for charging control being configured to supply power to the system to be powered, wherein the device comprises:
an interface module configured to be connected to an external charging device;
a battery unit comprising a plurality of battery cells connected in series;
a controller connected to the interface module, and configured to identify a charging mode of the external charging device and send a control instruction correspondingly according to the charging mode;
a charging circuit connected to the controller and the battery unit and configured to receive the control instruction, so as to charge the battery unit according to a charging signal output by the external charging device, wherein the charging circuit comprises:
a first charging unit connected to the interface module and the battery unit, and configured to receive the charging signal and directly charge the battery unit at a first charging speed;
a second charging unit connected to the interface module and the battery unit, and configured to receive the charging signal of the external charging device and charge the battery unit at a second charging speed, wherein the first charging speed is greater than the second charging speed; and
a first switch unit connected to the controller, the first charging unit and the second charging unit, and configured to receive the control instruction to conduct a first path constituted by the interface module and the first charging unit or conduct a second path constituted by the interface module and the second charging unit;
a plurality of second switch units connected to the charging circuit and the battery unit, wherein the plurality of second switch units are connected to the plurality of battery cells to form a plurality of charging branches; and
a voltage dividing circuit connected in series with the battery unit, and configured to divide an output voltage of the battery unit to obtain a power supply voltage suitable for powering the electronic device;
wherein the controller is further configured to send a switching instruction when the second path constituted by the interface module and the second charging unit is conducted; the second switch units are configured to turn on or turn off a charging branch where one of the battery cells is located according to the switching instruction, the charging branch at least comprises two of the battery cells.

11. The electronic device as claimed in claim 10, further comprising a backlight drive module, connected to a positive output terminal of the battery unit, and configured to receive an output voltage of a charging unit to drive the backlight drive module.

12. The electronic device as claimed in claim 10, wherein the charging mode comprises a fast charging mode or a normal mode, wherein:
when the charging mode is the fast charging mode, the controller sends a first control instruction, and the first control instruction is used to control the first switch unit to conduct the first path constituted by the interface module and the first charging unit; and
when the charging mode is the normal mode, the controller sends a second control instruction, and the second control instruction is used to control the first switch unit to conduct the second path constituted by the interface module and the second charging unit.

13. A method for charging control applied to a device for charging control, the method comprising:
identifying a charging mode of an external charging device, wherein the charging mode comprises a fast charging mode or a normal mode;
sending a first control instruction when the charging mode is the fast charging mode, and the first control instruction being used to control a first switch unit to conduct a first path constituted by an interface module and a first charging unit;
sending a second control instruction when the charging mode is the normal mode, and the second control instruction being used to control the first switch unit to conduct a second path constituted by the interface module and a second charging unit;
sending a switching instruction when the second path constituted by the interface module and the second charging unit is conducted by the first switch unit;
turning on or turning off a charging branch where one of a plurality of battery cells is located according to the switching instruction, the charging branch comprising two of the plurality of battery cells, wherein the charging branch is constituted by a plurality of second switch units and the plurality of battery cells;

controlling the first charging unit according to the first control instruction to directly charge the battery unit at a first charging speed according to the received charging signal; and controlling the second charging unit according to the second control instruction to directly charge the battery unit at a second charging speed according to the received charging signal, wherein the first charging speed is greater than the second charging speed.

14. The method as claimed in claim 13, further comprising:

receiving a charging voltage provided by the second charging unit for the battery unit, and sending the switching instruction according to the charging voltage.

* * * * *